United States Patent
Smith (10) Patent No.: US 7,653,614 B2
(45) Date of Patent: Jan. 26, 2010

(54) METHOD OF SEARCHING ACROSS MEDIA AND SOURCE TYPES

(75) Inventor: Kim C. Smith, Colleyville, TX (US)

(73) Assignee: Spotware Technologies, Inc., San Diego, CA (US)

( * ) Notice: Subject to any disclaimer, the term of this patent is extended or adjusted under 35 U.S.C. 154(b) by 248 days.

(21) Appl. No.: 09/354,052

(22) Filed: Jul. 15, 1999

(65) Prior Publication Data

US 2002/0059163 A1    May 16, 2002

(51) Int. Cl.
*G06F 17/30* (2006.01)

(52) U.S. Cl. .................. 707/3; 707/10; 707/104.1; 707/7; 725/45; 725/46

(58) Field of Classification Search .................. 707/1–5, 707/513, 500, 10, 102; 348/731; 725/48–53; 748/731
See application file for complete search history.

(56) References Cited

U.S. PATENT DOCUMENTS

| | | | | | |
|---|---|---|---|---|---|
| 5,740,549 | A | * | 4/1998 | Reilly et al. ................... | 705/14 |
| 5,819,273 | A | * | 10/1998 | Vora et al. ..................... | 707/10 |
| 5,987,454 | A | * | 11/1999 | Hobbs ........................... | 707/4 |
| 5,990,884 | A | * | 11/1999 | Douma et al. ................ | 345/327 |
| 6,029,165 | A | * | 2/2000 | Gable ............................ | 707/3 |
| 6,085,186 | A | * | 7/2000 | Christianson et al. .......... | 707/3 |
| 6,085,189 | A | * | 7/2000 | Pirahesh et al. ................ | 707/3 |
| 6,108,686 | A | * | 8/2000 | Williams, Jr. ................ | 709/202 |
| 6,122,648 | A | * | 9/2000 | Roderick ..................... | 707/513 |
| 6,172,674 | B1 | * | 1/2001 | Etheredge ................... | 345/327 |
| 6,230,324 | B1 | * | 5/2001 | Tomita et al. ................. | 725/51 |
| 6,262,713 | B1 | * | 7/2001 | Brusky et al. ............... | 345/419 |
| 6,732,369 | B1 | * | 5/2004 | Schein et al. ................. | 725/39 |

* cited by examiner

*Primary Examiner*—Cam Y T Truong
(74) *Attorney, Agent, or Firm*—Pearne & Gordon LLP (57) ABSTRACT

A method, system, signal, user interface, and software for searching information across different media types and sources is disclosed. The method includes identifying a search criteria and subsequently searching for information across one or more media types or sources based upon the search criteria. The search may also be conducted giving regard to user interaction information such as most recently viewed, most frequently viewed, preferences, etc. The media information may be stored locally or remotely and is presented to a user using a single user interface.

21 Claims, 9 Drawing Sheets

METHOD OF SEARCHING ACROSS MEDIA AND SOURCE TYPES

CROSS REFERENCE TO RELATED APPLICATIONS

U.S. patent application Ser. No. 09/299,826, filed on Apr. 26, 1999 entitled "A Method of Maintaining Search Results Pages" assigned to Gateway 2000, Inc., Reference No. GW98-0881, is incorporated herein by reference.

U.S. patent application Ser. No. 09/374,781 filed of Aug. 16, 1999 entitled "Method and System for Presenting Content Selection Options" assigned to Gateway 2000, Inc. Reference NO.GW98-0880, is incorporated herein by reference.

U.S. patent application Ser. No. 09/298,005, filed on Apr. 22, 1999 entitled "Universal Content Database Structured Around Relationship Being Like" assigned to Gateway 2000, Inc., Reference No. GW98-0882, is incorporated herein by reference.

U.S. patent application Ser. No. 09/298,006, filed on Apr. 22, 1999 entitled "A Method of Creating Default Lists of Content Probable Interest" assigned to Gateway 2000, Inc., Reference No. GW98-0884, is incorporated herein by reference.

FIELD OF THE INVENTION

The present invention relates generally to information searching and more particularly to information searching across all media types.

BACKGROUND OF THE INVENTION

On the forefront in the advances of the home entertainment industry is the emergence of multimedia sources available to a new generation of home entertainment systems, namely, convergence systems. PCs, TVs, DVDs, CD players, EPGs, etc., are being converged into one system, providing users a broad spectrum of home entertainment. What is lacking, however, is the capability to view the voluminous information associated with this myriad of media sources in one coherent user interface.

In merging components into one system (i.e., PCs, TVs, DVDs, EPGs, etc.), convergence systems contain several different media source types. For example, PCs contain information in several different file formats (i.e., .ini, .txt, .exe, etc.), Electronic Program Guides, or EPGs, contain information for current and future television programming, and the Internet contains a plethora of information on virtually every subject. As more components are added to convergence systems, new media source types are generated, forcing the user to utilize a plurality of different user interfaces to cull through large quantities of available information for the desired information.

For example, when a user wants to locate a file on a personal computer, the user must open a local search tool that will first search for files and then list the found files by name, date, extension, etc. Advanced searches for content contained within files may be performed; however, depending on the efficiency of the system and the types of files searched, the user could be left with lengthy wait times for search results that may produce useless information.

In another example of searching across multiple media source types, suppose a user wanted to locate the TV channel on which a sporting event is airing and further wanted to listen to a radio or Internet broadcast of the sporting event in lieu of listening to the TV announcers. Current search methods would prompt the user to open an EPG, locate the event, and further open a web browser and/or search engine of some sort to locate an Internet address or a radio broadcast station covering the sporting event, forcing the user to switch between applications to access desired information.

A further shortcoming of present systems is the inability to provide data that is representative across all media source types. For example, suppose a user used a web browser and a search engine to locate information about a movie and wanted to further find the movie's soundtrack, a website for the movie, or a pay-per-view cable channel airing the movie. In this scenario, the user would have to make a separate inquiry using an appropriate media user interface to find the desired information. Further, given that the user is utilizing a convergence system, the search would not provide information relating to the current availability of resources within the system, such as CDs, DVDs, games, etc.

Since convergence systems do not provide users searchable information across all media types, they fall short of total convergence of resources. Therefore, what is needed is a system, user interface, software, method, and signal enabling a user to search for information across all media source types using a single interface.

SUMMARY OF THE INVENTION

Accordingly, the present invention provides a method comprising the steps of inputting a search criteria and searching at least one database of content information based upon the search criteria wherein the content information corresponds to information from a plurality of content sources of one or more types.

The present invention further provides a system comprising at least one processor, memory operably coupled to said processor, a user interface configured to input a search criteria, and search at least one database of content information based upon the search criteria wherein the content information corresponds to information from a plurality of content sources of one or more types.

The present invention further provides a user interface configured to input a search criteria and search at least one database of content information based upon the search criteria wherein the content information corresponds to information from a plurality of content sources of one or more types.

The present invention further provides a computer readable medium tangibly embodying a program of instructions which implement a method comprising the steps of inputting a search criteria and searching at least one database of content information based upon the search criteria wherein the content information corresponds to information from a plurality of content sources of one or more types.

The present invention further provides a signal embodied in a propagation medium comprising at least one instruction configured to input a search criteria and at least one instruction configured to search at least one database of content information based upon the search criteria wherein the content information corresponds to information from a plurality of content sources of one or more types.

It is an object of the present invention to search across all media types for an item.

It is another object of the present invention to search within a single media type for an item.

It is another object of the present invention to provide a user with a list of like items across all available media types based upon user interaction.

One advantage of the present invention is its ability to provide one user interface to search across all media types.

Another advantage of the present invention is its ability to perform a search based on like or similar information for one or more media source types.

Another advantage of the present invention is its ability to perform a search across one or more media types based upon user interaction.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF A PREFERRED EMBODIMENT OF THE INVENTION

In the following detailed description of preferred embodiments, reference is made to the accompanying drawings which form a part hereof, and in which is shown by way of illustration, specific preferred embodiments in which the invention may be practiced. These embodiments are described in sufficient detail to enable those skilled in the art to practice the invention, and it is to be understood that other embodiments may be utilized and that logical, mechanical and/or electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
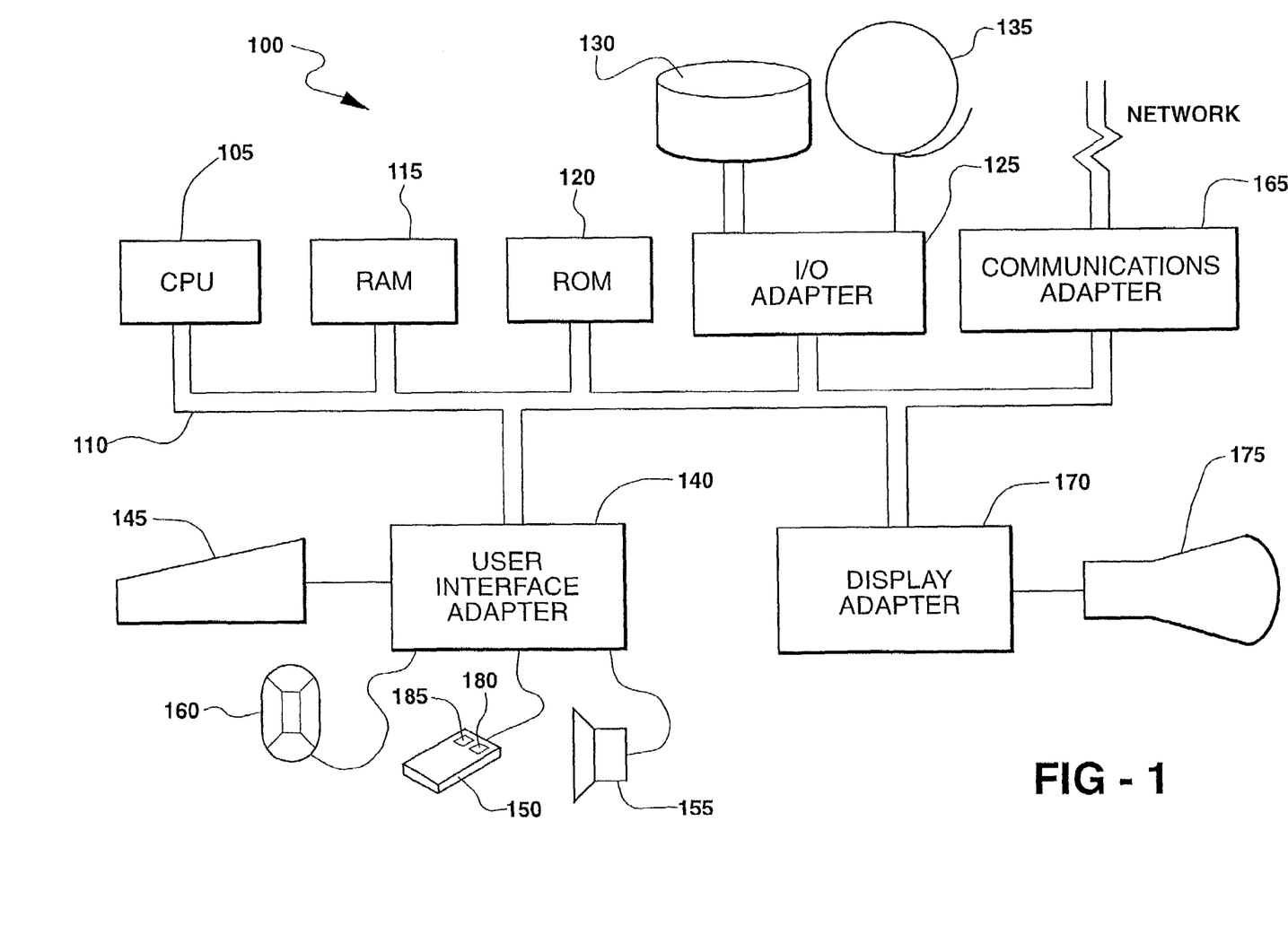
FIG. 1. illustrates a detailed block diagram showing a computer system according to a preferred embodiment of the present invention.

A representative hardware environment for practicing the present invention is depicted in FIG. 1 which illustrates a typical hardware configuration of an information handling system 100 in accordance with the present invention, having a central processing unit (CPU) 105 such as a conventional microprocessor and a number of other units interconnected via at least one system bus 110. Information handling system 100 may be, for example, a portable or desktop Gateway computer or a Gateway Destination system (Gateway and Destination are trademarks of Gateway, Inc.). Information handling system 100 shown in FIG. 1 includes random access memory (RAM) 115, read-only memory (ROM) 120, and input/output (I/O) adapter 125 for connecting peripheral devices such as a disk unit 130 and a tape drive 135 to system bus 110, a user interface adapter 140 for connecting a keyboard 145, a mouse 150, a speaker 155, a microphone 160, and/or other user interface devices to system bus 110, a communications adapter 165 for connecting information handling system 100 to an information network such as the Internet, and a display adapter 170 for connecting system bus 110 to a display device such as monitor 175. Mouse 150 typically has a first button and a second button, 180 and 185 respectively, and is used to control a cursor (not shown) displayed on the monitor 175.

Figure 2:
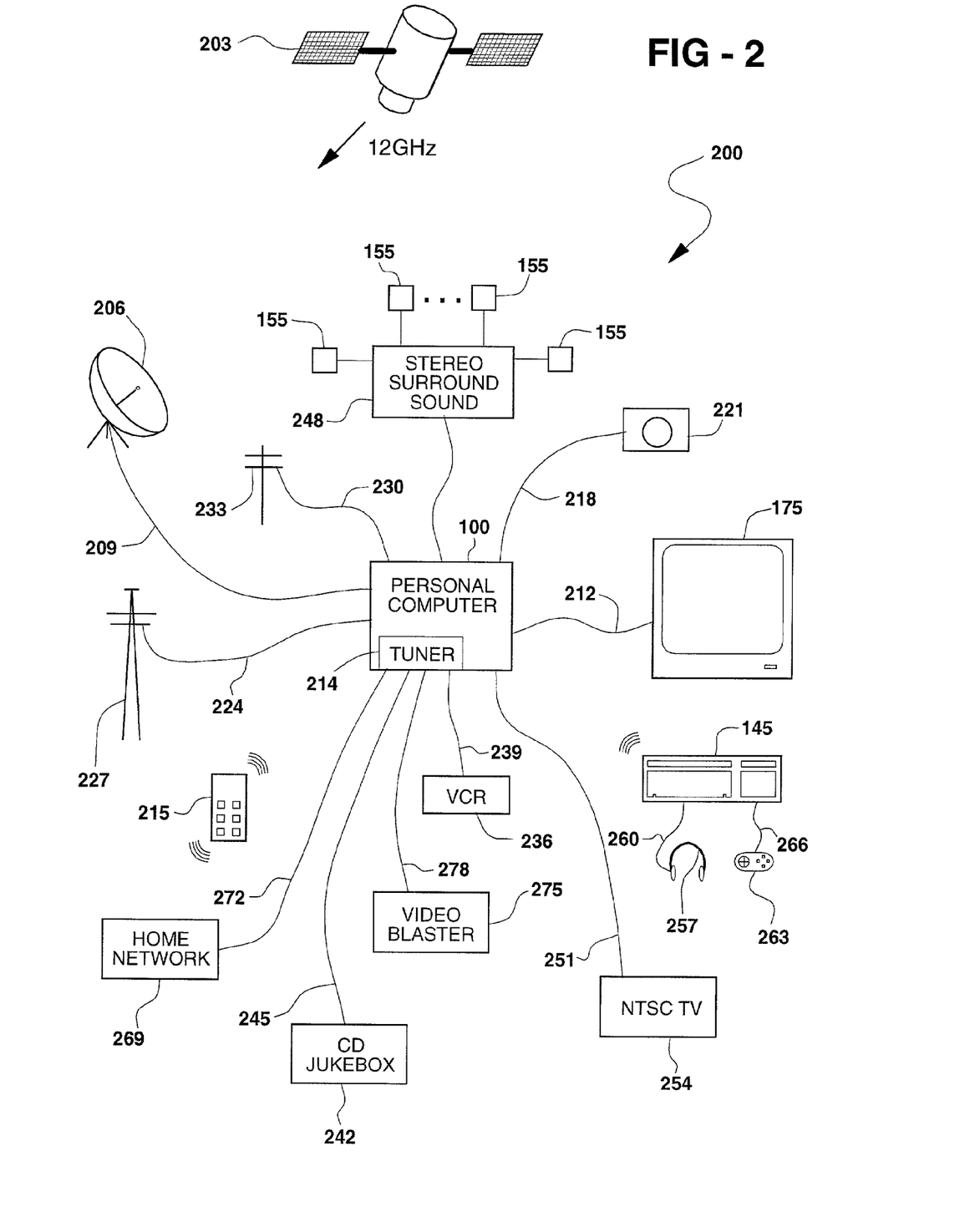
FIG. 2 illustrates a detailed block diagram showing a convergence system according to a preferred embodiment of the present invention.

Referring next to FIG. 2, a home entertainment or convergence system such as the Gateway Destination System mentioned above is shown generally at 200. Reference numerals or letters in FIG. 2 which are like, similar, or identical to the reference numerals or letters of FIG. 1 indicate like, similar, or identical components or features. External to convergence system 200 is satellite 203 which, in one preferred embodiment, is an HS 601 model operated by Hughes at a 101 degree west longitude geosynchronous orbital location and which transmits signals comprising 150 channels of modulated digital video, audio, and data at a frequency of about 12 GHz. The satellite signals are received by home entertainment system 200 through antenna 206 containing a low noise block converter amplifier. Antenna 206 is preferably about 18 inches in diameter and receives left- and right-hand circularly polarized signals between 12.2 and 12.7 GHz. Antenna 206 provides a "downconverted-spectrum" signal between 950 and 1450 MHz via a coaxial cable or other suitable communication medium 209 to information handling system 100, such as a personal computer or other system or circuitry capable of processing data. Suitable antennas 206 are already being manufactured and sold by RCA Corporation via direct sales and through numerous major retail chains such as Radio Shack.

System 100 contains circuitry and software to further process signals from the antenna, generally demodulating and decoding the signal to produce a VGA (video graphics adapter) signal. The VGA signal is provided via a standard VGA-compatible monitor cable to drive large screen data quality monitor 175 which is suitable for viewing in a family room or entertainment room environment. System 100 provides for user input by means of remote controls 215 and 145. Remote control 215 comprises a hand-held size device with standard television controls and a numeric keypad and, in one embodiment, VCR (video cassette recorder) controls and a pointing device. It provides RF (radio frequency) or IR (infrared) control signals received by system 100. Remote control 145 is a full function personal computer keyboard with additional standard television and VCR controls and a pointing device which is preferably in the form of a touchpad, and it also provides RF control signals to system 100. RF control signals were selected over IR control signals or hardwired connections in one embodiment due to its benefits in a home entertainment environment. RF control allows the system to be in a different room from monitor 175, or if in the same room, a clear line of sight is not required. In another embodiment, IR control signals were selected because the standard circuitry is available at a low cost. Monitor cable 212 is a standard type cable typically used on VGA display devices and comprises up to 15 electrical conductors interfacing with monitor 175 in a D-series shell connector. In one embodiment, full multi-media sourcing and destinationing of audio/video/data (A/V/D) broadcast is provided for.

Information handling system 100 may include a tuner 214, tuner circuitry, or card capable of both tuning to multiple channels and receiving television information or signals in the form of the NTSC (National Television Standards Committee) or PAL (Phase Alteration Line) forms from any medium such as from a cable system or from a digital satellite system. One embodiment of the signal on cable 209 from satellite dish 206 provides digital A/V/D signals from such sources as DirecTV or Primestar (DirecTV and Primestar are trademarks of their respective companies). In another such embodiment, the signal on cable 209 provides analog A/V such as NTSC (National Television Systems Committee) antenna signals. In another such embodiment, the signal on cable 218 from camera 221 provides analog A'sNV such as NTSC audio/video signals. In further embodiments, the signal on cable 224 from cable-data source 227 provides analog and/or digital A/V/D. In further such embodiments, the signal on cable 230 from PSTN (Public Switched Telephone Network) 233 provides data or phone signals such as ISDN (integrated services digital network) or POTS (plain old telephone system) signals. In one set of such embodiments, system 100 is programmed to automatically record analog signals such as television programming onto recordable media such as a video tape in VCR 236 coupled to cable 239. In another such set of embodiments, system 100 is programmed to automatically record digital signals such as digital television programming or CD-ROM (Compact Disk—Read Only Memory) type audio onto recordable media such as recordable compact disks in CD/DVD jukebox 242 coupled to cable 245. CD/DVD jukebox 242 also plays CDs, CD-ROMs, or DVD-ROMs for use elsewhere. In another such embodiment, signals are sent to stereo surround sound system 248 for audio output to one or more speakers 155, and on cable 251 to TV 254. In one such embodiment, earphones 257 on cable 260 and gamepad 263 on cable 266 provide additional input/output through remote control 145. Home network 269 is "smart wiring" used to transmit data and control within the home, coupled by cable 272 to system 100. Videoblaster 275 provides video signal processing on cable/connector 278. Cables 224, 209, 230, 218, 251, 239, 278, 245, 260, and 266 are examples of communication connections that can be wired coupling or wireless, such as RF or IR.

One example of convergence system 200 is the Destination System using the DestiVu user interface manufactured and sold by Gateway, Inc. In this manner, convergence system 200 is a fully functional computer integrated with a television providing TV viewing (via broadcast, cable, satellite, VCR, digital disk, or other broadcast media) and personal computing functionality. This convergence of computer and television enables a user the combined access to both television programs and information as well as computer related functionality such as computer information and programs and Internet access.

Although many of today's televisions employ much of the same hardware resources employed by computers such as information handling system 100, it is possible that the present invention might be practiced in other electronic devices or in networked electronic devices. For example, with the development of audio/video networking such as the recently proposed HAVi standard, television sets or other audio/video devices such as audio/video receivers and VCRs that do not themselves contain such resources could implement the present invention by utilizing the resources of other devices on a network.

Figure 3:
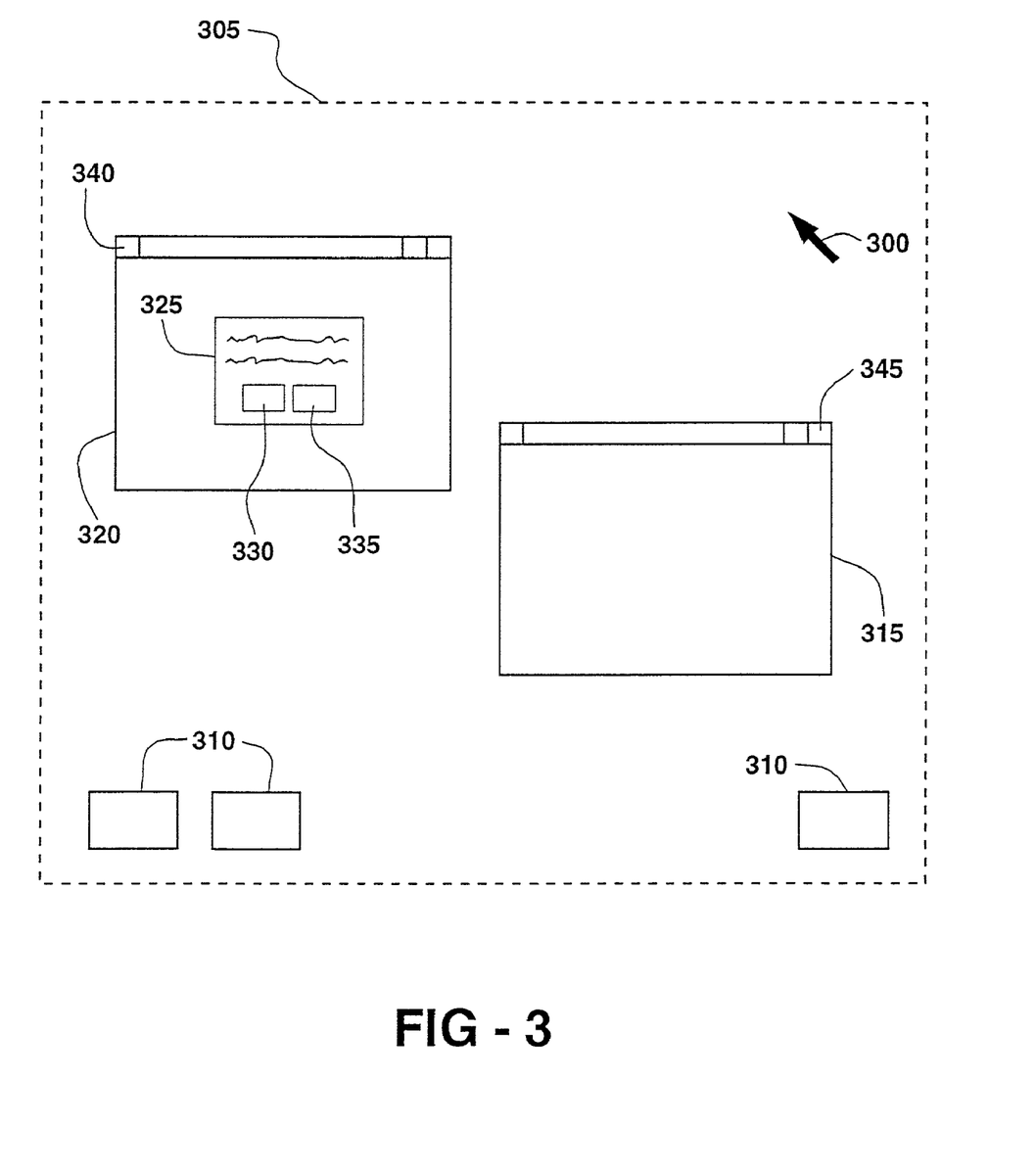
FIG. 3 shows the desktop of a computer operating system user interface, typically employed on a computer system as in FIGS. 1 and 2, according to a preferred embodiment of the present invention.

Referring next to FIG. 3, a detail of an operating system's graphical user interface, or GUI, as is typically displayed on monitor 175 in accordance with the present invention is illustrated. Reference numerals or letters in FIG. 3 which are like, similar, or identical to the reference numerals or letters of FIGS. 1-2 indicate like, similar, or identical components or features. The operating system shown in FIG. 3 is IBM's OS/2 (OS/2 is a trademark of International Business Machines Corporation). However, the present invention will work with DestiVu, Windows 98, Windows 95 (DestiVu is a trademark of Gateway, Inc. and Windows 98 and Windows 95 are trademarks of Microsoft Corporation), or any other graphical user interface. This GUI includes cursor 300, desktop 305, three icons 310, a first and a second window, 315 and 320 respectively, and dialog box 325, all of which are well known in the art. Dialog box 325 further contains a first and a second button, 330 and 335 respectively. Programs are represented by the graphical user interface as either icons 310 or windows 315 and 320. The horizontal region along the top of a first or a second window, 315 and 320, is called a first title bar or a second title bar, 340 and 345 respectively. The program window, 315 or 320, has the "focus" when it has been designated by the user or by the operating system to receive input from keyboard 145 or mouse 150. In OS/2®, the user gives the window focus by clicking a mouse button, 180 or 185, when cursor 300 is inside that window. Some operating systems, however, give a window the focus merely whenever cursor 300 is present within that window. The operating system indicates which program has the focus by changing the color of the focused window's title bar, 340 or 345.

Now that a hardware environment and user interface to practice the present invention have been described, a further understanding of content source types, or media source types, and their relationship to databases must be conveyed. In a preferred embodiment of the present invention, a link is an association made between one type of information and another. Information today is commonly presented through the Internet where a search engine accesses databases with links to periodicals, advertisements, home pages, etc., of interest to the user. This information is accessed through the use of a web browser, but an individual is at a loss when wanting to access information local to the system being used. For example, if a user wanted to access all available jazz music CDs available to system 100/200, or executable files for all available action adventure games that exist on the system, the user must search for each of these items separately. The present invention bridges the gap between media source types, providing a means for accessing like or similar information across all media source types, creating a kind of "Media Thesaurus" for the user.

Figure 4:
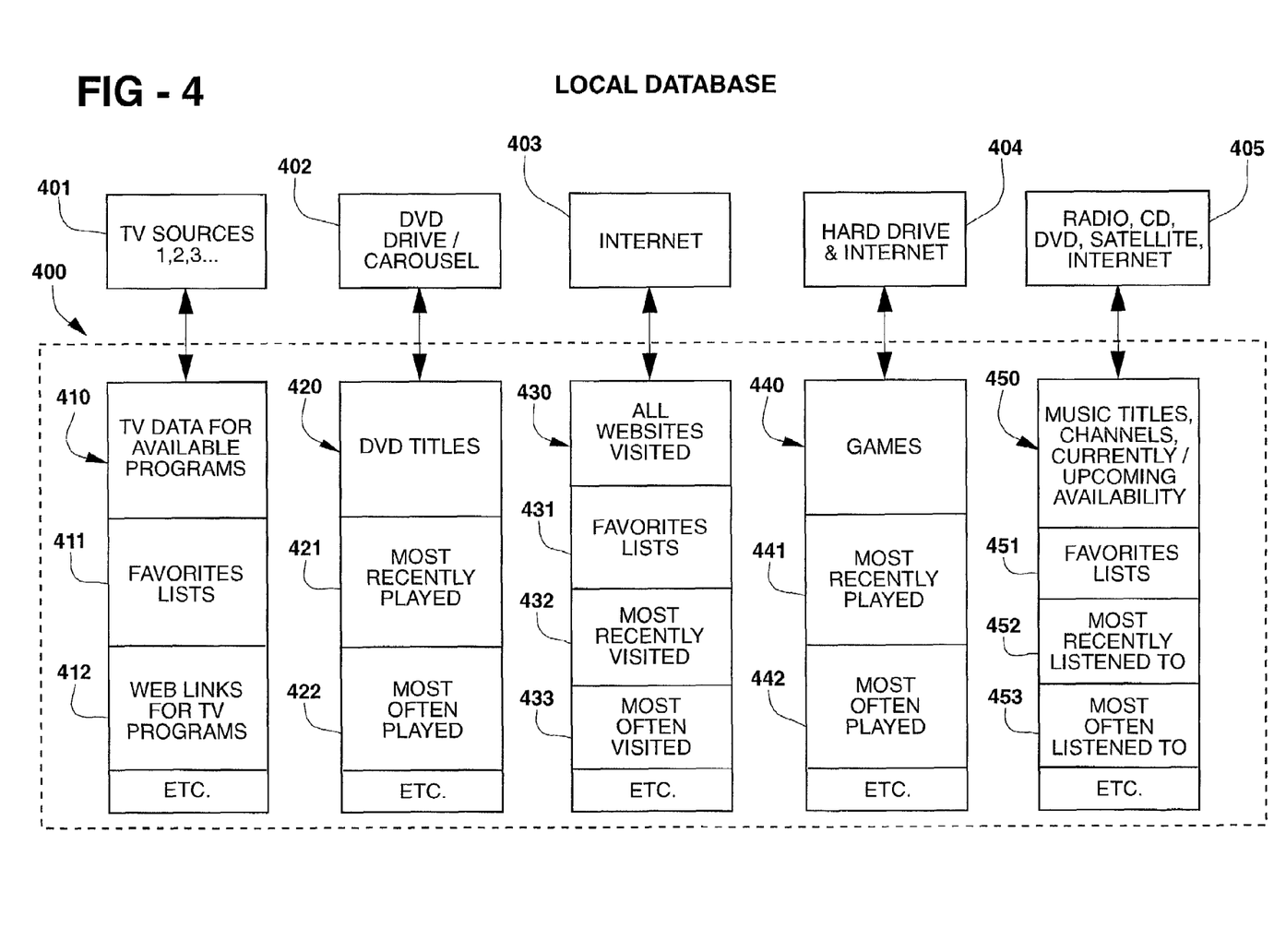
FIG. 4 is an illustration of a local database according to a preferred embodiment of the present invention.

Referring now to FIG. 4, an illustration of a local database according to a preferred embodiment of the present invention is shown, wherein reference numerals or letters in FIG. 4 which are like, similar, or identical to the reference numerals or letters of FIGS. 1-3 indicate like, similar, or identical components or features. In a preferred embodiment, the local database contains information from several types of media sources. Local database 400 contains several media sections, wherein each section is associated with its media source type including TV data 410/401, DVD titles 420/402, Websites 430/403, Games 440/404, and Music titles 450/405. Persons skilled in the art can appreciate the ability to add more media sections to database 400 as new media sources become available to system 100/200. Each of the media sections contains large quantities of information relating to each unique media source. For example, TV data 410 section could contain program information such as current or available programming, networks, websites, ratings, episodes, etc., and DVD titles 420 section could contain available movie titles, genre, ratings, length, etc. Additional information is also included in each media section relating to a user's interaction with each unique media source type. TV data 410 contains a user's favorites list 411 and web links 412 of program or network homepages. DVD titles 420 contains a user's most recently played list 421 and a most often played list 422. Website 430 information will include a favorites list 431, a most recently visited list 432, and a most often visited list 433. Games list 430 contains a reference to the most often played list 442 and most recently played list 441, and music titles 450 contains a favorites list 451, a most recently listened to list 452, and a most often listened to list 453. In other embodiments, additional entries may be added to local database 400 to provide increased volumes of user-specific data where acquisition and storage of user interaction entries are well established in the art.

In one embodiment of the present invention database 400 can be updated dynamically. As new or updated information becomes available, the present invention can be modified to dynamically update database 400 upon receipt of the information. This ensures that the most current information is being used to create "like" links for users. Also, database 400 can be a remote database such as a server operably associated with system 100 or a local database operably associated with system 100. Database 400 may also be stored using a combination of local and remote storage means operably associated to system 100. Those skilled in the art can appreciate that information, and modification and storage thereof, may be configured in a plurality of ways without departing from the spirit and scope of the present invention.

Figure 5:
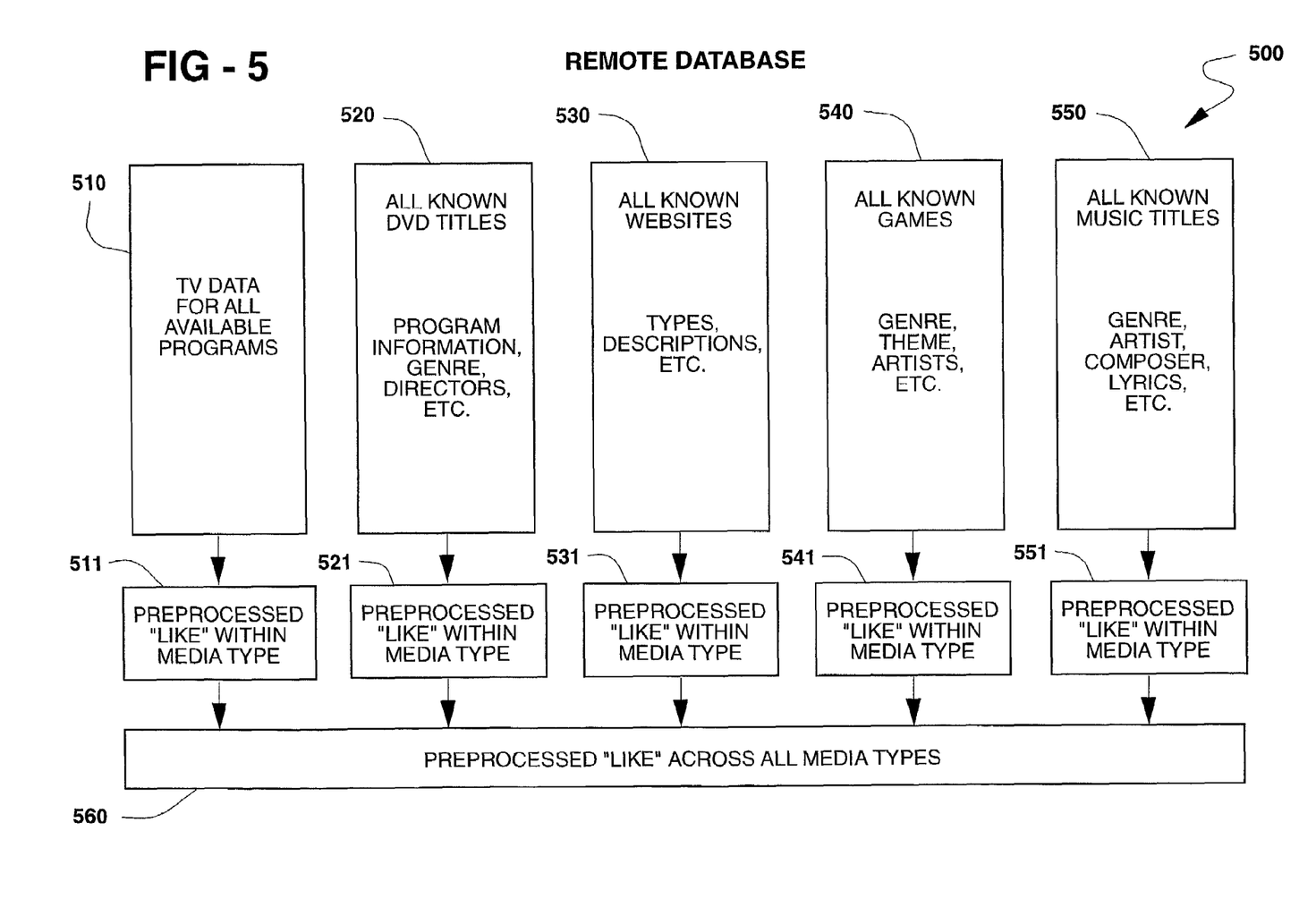
FIG. 5 is an illustration of a remote database according to a preferred embodiment of the present invention.

Referring next to FIG. 5, an illustration of a remote database according to a preferred embodiment of the present is shown, wherein reference numerals or letters in FIG. 5 which are like, similar, or identical to the reference numerals or letters of FIGS. 1-4 indicate like, similar, or identical components or features. In FIG. 5, a remote database is illustrated and is a mirror of local database 400, given the available media source types. Remote database 500 is disclosed in co-pending application GW98-0882, "A Universal Content Database Structured Around the Relationship Like." Remote database 500 does not contain references to user interactive entries as provided in local database 400. However, remote database 500 does contain large quantities of information for each available media source type and predefined links centered around the relationship of being "like" data. Remote database 500 is composed of several types of media source sections as described above by database 400 and further contains two additional types of sections.

The first additional section type contains preprocessed links of the same media type. Therefore, database 500 contains unique sections of preprocessed links that coincide with each the type of media source. Thus, database 500 has preprocessed links for TV media 511, DVD media, 521, website media 531, games media 541, and music media 551. For example, suppose a user wanted to search for only TV data relating to local news programs. The preprocessed TV media 511 section of database 500 would be accessed to search for links containing TV data for local news programs. The second section type contained in database 500 contains preprocessed links for "like" information across all media types. The preprocessed "LIKE" across all media types 560 section contains links to information for all of the media source types with the links being "like" or similar in some way. For example, suppose a user wanted to locate all available information for the movie "Jurassic Park." Section 560 of database 500 may contain links of preprocessed "like" information across all media types such as video games may be airing on a network. Therefore, the amount of data, data entries, and links contained within remote database 500 can be quite extensive.

Figure 6:
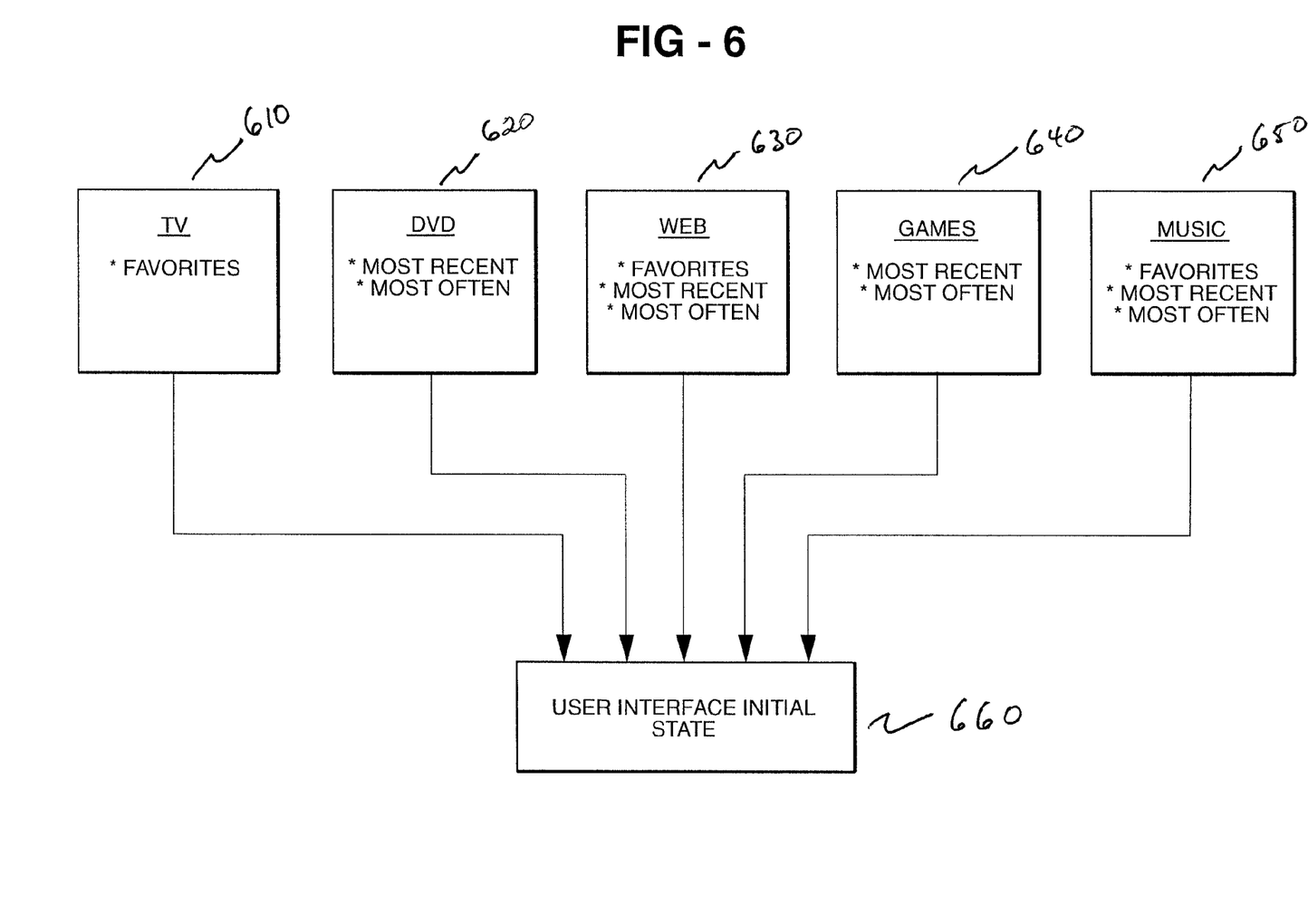
FIG. 6 is a block diagram of data for an initial user interface according to a preferred embodiment of the present invention.

Referring next to FIG. 6, an illustration of data used in an initial user interface according to a preferred embodiment of the present invention is shown, wherein reference numerals or letters in FIG. 6 which are like, similar, or identical to the reference numerals or letters of FIGS. 1-5 indicate like, similar, or identical components or features. In a preferred embodiment, the data contained in FIG. 6 illustrates data used in an initial setup of a user interface. The data is obtained from the local database 400 and contains information for all media sources available to system 100/200. Each element contains at least one reference to the user interaction entries listed in local database 400 in addition to the current available media information for system 100/200. For example, music titles data 650 would contain a list of the most recently played entries and would also contain information relating to all available music titles for system 100/200. As a further example, the games data 640 would contain a reference to the most recent and most often played games in addition to a listing of the games available to system 100/200. It can be appreciated by those skilled in the art that any combination of data contained in local database 400 may be used to facilitate an initial setup.

Figure 7:
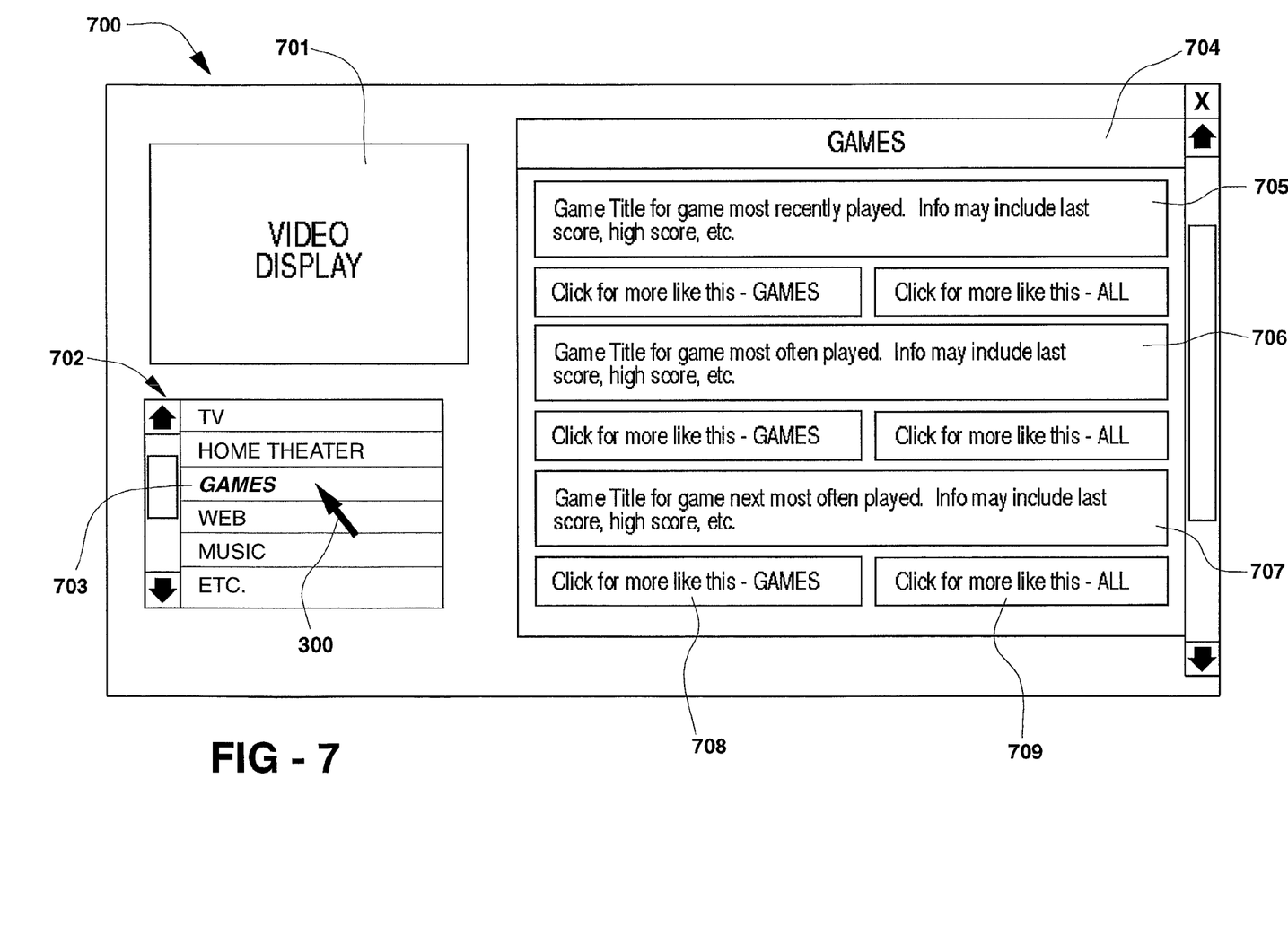
FIG. 7 is a block diagram of a user interface according to a preferred embodiment of the present invention.

Referring now to FIG. 7, an illustration of a user interface according to a preferred embodiment of the present invention is shown, wherein reference numerals or letters in FIG. 7 which are like, similar, or identical to the reference numerals or letters of FIGS. 1-6 indicate like, similar, or identical components or features. FIG. 7 is an illustration of a user interface in co-pending application GW98-0880. "Method for Presenting Content Selection Options Available Across All Media Types and Sources." The user interface is shown generally by interface 700 and contains three main sections: video display 701, media menu 702, and search contents menu 704. In alternate embodiments, any combination of these elements maybe displayed as well as additional information, such as a date and time indicator, channel number for video display, a program menu bar, etc., without departing from the true spirit of the invention. User interface 700 may be used to search for and display information pertaining to media source types. Search content menu 704 displays information for the selected media type selected using cursor 300 and media menu 702, wherein utilization of cursor 300 and selection of menu items are well known in the art. In the example illustrated, the games media reference 703 is selected, and the available information is displayed in search contents menu 704. Menu 704 contains a list of game titles such as most recently played 705, most often played 706, and subsequent next most often played games 707. Each of the cells contains the title of a game and may contain additional information such as the highest score, the latest score, etc. Menu 704 also contains additional search options to provide more information for each game title. The "Click more like this-GAMES" button 708 allows a user to search for additional games information. When the user selects option 708, a search is performed on local and remote databases 400/500 to find game information that is "like" the game title displayed. Menu 704 also contains a "Click for more like this-ALL" button 709 for each of the entries which allows a user to search for information across all media types relating to the associated game title. This search involves accessing local and remote databases 400/500 for information that is "like" the game title in all media source types and involves finding information relating to the game title across all media types (TV, DVD, Web, etc.). Once located, information relating to the game title will be displayed for the user to access and narrow the search, if desired.

Figure 8:
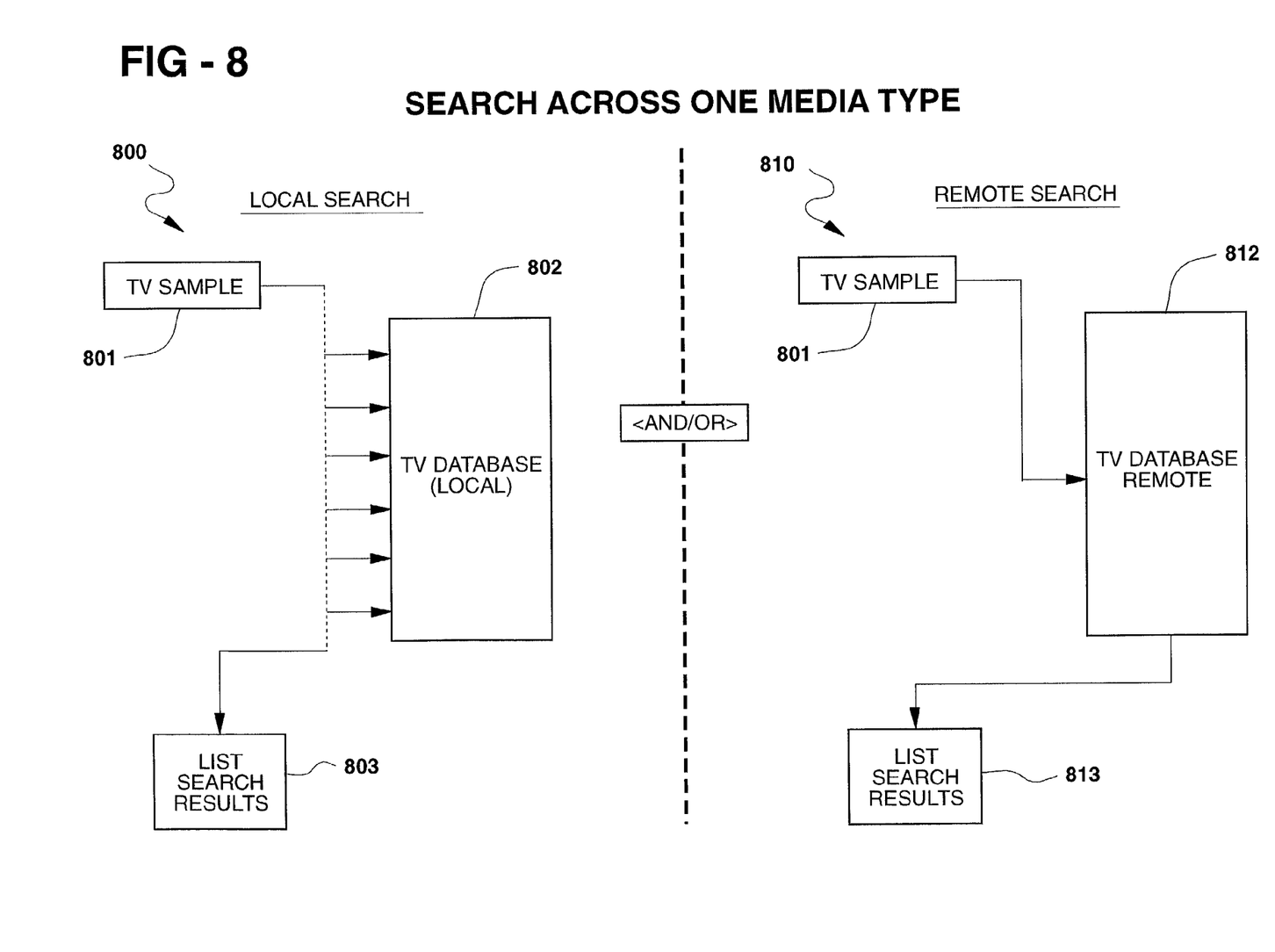
FIG. 8 illustrates a method of searching across one media type according to a preferred embodiment of the present invention.

Referring now to FIG. 8, a method of searching within one media source type according to the preferred embodiment of the present invention is shown, wherein reference numerals or letters which are like, similar, or identical to the reference numerals or letters of FIGS. 1-7 indicate like, similar, or identical components or features. The method shown in FIG. 8 is a search method for one media type using a local search 800 using database 400 and a remote search 810 using database 500. The local search 800 begins at step 801 when the user provides a search parameter such as a TV sample to the system. Herein, a TV sample could be a program name, event, episode description, etc. The method then proceeds to step 802 where local database 400 is searched for entries that are like or similar to the sample obtained in step 801. Given that the scope of the search is limited to only TV data, the method would search only TV data 410 of local database 400. Also, if the sample obtained in step 801 was of a different media type (i.e. DVD, website, games, etc.), then only that particular section of database 400 would be searched for "like" information. Upon obtaining the search results, the method proceeds to step 803 where the search results are displayed using user interface 700. Only those items found that are like or similar are displayed, wherein organizing and displaying search results are well known in the art.

In a parallel effort, a remote search 810 is conducted using remote database 500. This search involves locating preprocessed "like" information relating to one media type. The method begins at step 801 where a user provides a search parameter such as a TV sample. The method then proceeds to step 812 where remote database 500 is searched to find information that is "like" or similar to the TV sample provided. In this case, given that a TV sample was provided by the user, only the preprocessed "LIKE" TV media 511 section of remote database 500 is accessed to locate information for the same media type. As mentioned above, if the user provided a sample for another media type (i.e. DVD, website, etc.), then only those preprocessed links would be accessed to locate "like" or similar information. Upon finding the like or similar information, the data is then transferred to the requesting system, and the results are displayed at step 813 wherein organization and displaying program information are well established in the art. In other embodiments of the present invention, any combination of searching between local and remote databases 400/500 may be deployed to search for information within the same media type.

Figure 9:
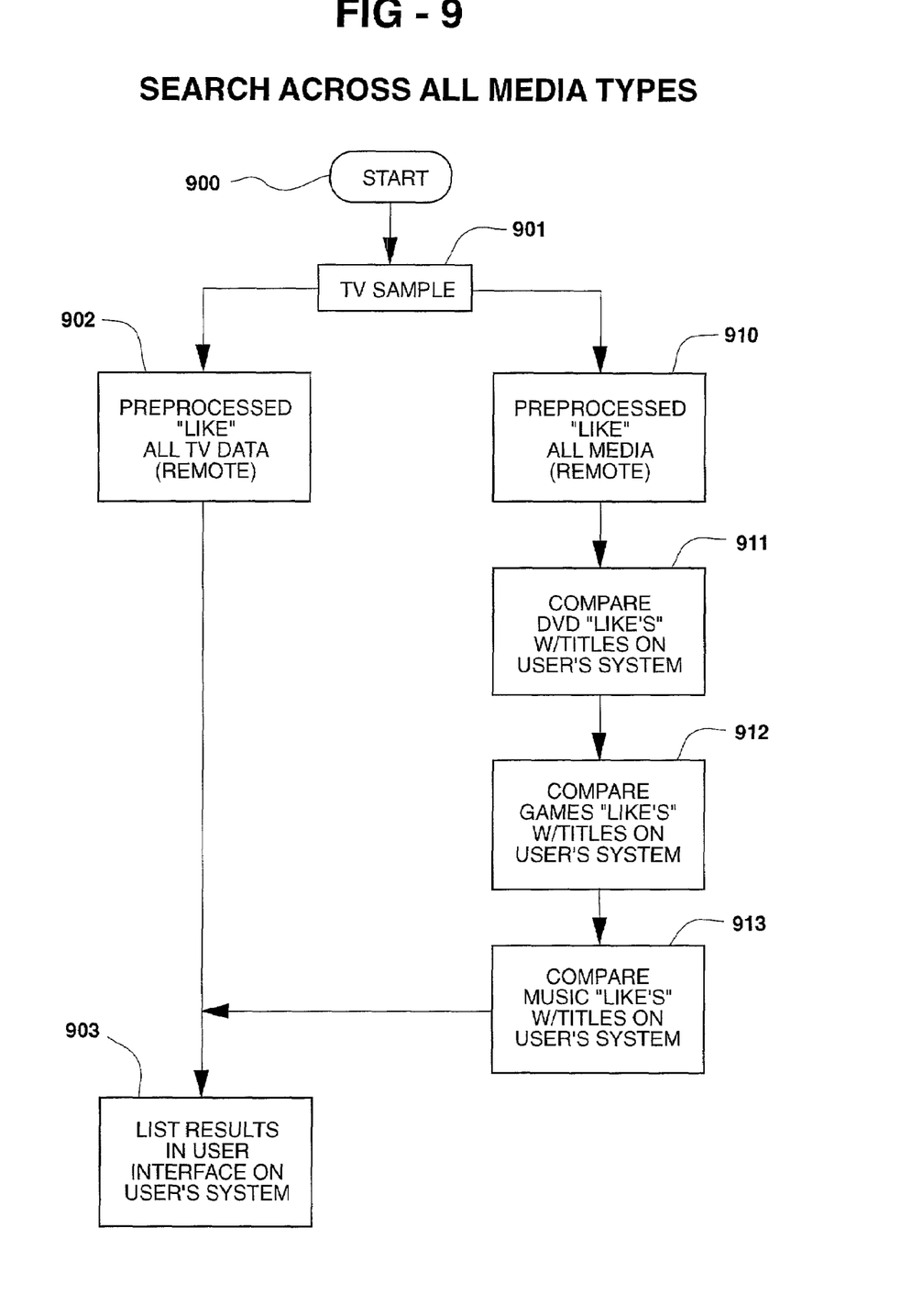
FIG. 9 is an illustration of the method of searching across all media types according to a preferred embodiment of the present invention.

Referring now to FIG. 9, an illustration of a method of searching across all media types according to a preferred embodiment of the present invention is shown, wherein reference numerals or letters which are like, similar, or identical to the reference numerals or letters of FIGS. 1-8 indicate like, similar, or identical components or features. The method begins at step 900. At step 901 the user provides a search criteria such as a TV sample. The method then proceeds in two directions, the first being step 902 where the method accesses preprocessed "like" information within the same media type using the preprocessed links of TV media 511 of remote database 500. The method then proceeds to step 903 where the search results are displayed. The second direction is a parallel effort where the method proceeds to step 910 where the links of preprocessed "LIKE" across all media types 560 section of database 500 is accessed to find information that is "like" the selected TV sample obtained in step 901. For example, if the user provided a TV sample of "Rugrats" for the search, the method would locate a link in section 560 that would provide available media information for a website, a DVD title, and a game based on "Rugrats." The search may also produce additional information such as pay per-view events, Internet broadcasts, radio programs, CDs, etc., relating to the TV sample "Rugrats." Upon completing the search at step 910, the method then proceeds to steps 911, 912, 913 where it compares the search results of step 910 to the system's available media resources. For example, at step 911, the search results are compared to all available DVD titles to determine availability of DVD media that may be played. Similarly, the method compares available games 912 and music titles 913 that are "like" the search results and are available to the user via system 100/200. In another embodiment, the comparison of steps 911, 912, 913 may be used to "filter" information based on available/current resources. For example, if a DVD title is not available to the user, the search results may be flagged as being unavailable media, or the search results may be omitted prior to being displayed to the user. In another embodiment, the filtered information may be flagged as being locally unavailable to the system but accessible via pay-per-view channels, websites, etc. In other embodiments, any combination of comparisons made to available resources may be accomplished without departing from the true spirit of the invention. Also, organizing, displaying, and searching for information across all media types may be accomplished using remote database 500 and/or local database 400, system 100/200, or any combination thereof. Additionally, a user may perform a search in a plurality of ways. For example, a user may input a textual string consisting of letters and Boolean operators that assist in narrowing searches. In another embodiment, a user may use a "point and click" method of searching for information where the user does not enter any textual information to perform the search. These are two embodiments used to perform searches where other methods may be incorporated without departing from the true spirit and scope of the present invention.

In summary, the above methods describe searching local and remote databases for data across at least one media type. The local database resides on the user's system and contains information relating to all available types of media sources. The local database also contains user interaction entries such as favorites, most recently used, most often used, etc. The remote database is a mirror of the local database giving regard to the available media sources. The remote database is a voluminous database and contains preprocessed links of "like" information in two formats, the first section containing preprocessed links to "like" information within the same media type and the second section containing preprocessed links to "like" information across all media types. Searching for data is accomplished using a user interface that displays search results for all media source types. In a preferred embodiment, a search is accomplished using links, but in other embodiments, textual information with wild cards and characters may be utilized to navigate a search and narrow search results. In addition, search results may be organized and displayed using user interface 700 or any other user interface configured to display search results, as can be appreciated by those skilled in the art.

Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

Although the invention has been described with a certain degree of particularity, it should be recognized that elements thereof may be altered by persons skilled in the art without departing from the spirit and scope of the invention. One of the preferred implementations of the invention is as sets of instructions resident in the random access memory 115 of one or more computer or information handling systems configured generally as described in FIGS. 1-9. Until required by the computer system, the set of instructions may be stored in another computer readable memory, for example, in a hard disk drive or in a removable memory such as an optical disk for eventual use in a CD-ROM drive or a floppy disk for eventual use in a floppy disk drive. Further, the set of instructions can be stored in the memory of another computer or encoded or embodied in a signal, such as an analog or digital signal, embodied in a propagation medium and transmitted over the propagation medium by a user. The propagation medium may include a local area network or a wide area network, such as the Internet, or other propagation medium. One skilled in the art would appreciate that the physical storage or encoding of the sets of instructions physically changes the medium upon which it is stored or encoded electrically, magnetically, or chemically so that the medium carries computer readable instructions and other information. The invention is limited only by the following claims and their equivalents.

What is claimed is:

1. A computer system configured to search across one or more media source types comprising:
    a user interface configured to receive inputs of search criteria for a search relating to an item of a first media source type, the item being one of a first plurality of items of the first media source type;
    at least one processor configured to execute instructions to cause a computer to:
    limit the search to said one or more media source types,
    conduct the search based on the search criteria in a database, the database being a remote database, wherein the search is conducted in one or more sections of the database, each of the one or more sections of the database respectively corresponding to one of said one or more media source types, and the one or more sections comprising a first section of the database which includes content information about first plurality of items, the content information coming from a plurality of content sources, said plurality of content sources being a plurality of hardware coupled to said computer system, and wherein said one or more sections of the database comprises a second section of the database which includes content information about a second plurality of items which are of a second media source type, wherein the search further includes filtering search results by comparing the search results from the remote database to local content source availability of the computer system, wherein the remote database is a voluminous database and contains preprocessed links of like information in two sections, the first section containing preprocessed links to like information within same media source type and the second section containing preprocessed links to like information across all media types prior to said user interface receiving inputs of the search criteria;
    a display configured to provide the search results of the search; and
    memory coupled to said processor and configured to store the first section of the database.

2. The system, as recited in claim 1, wherein said display is configured to display a cursor and a cursor control device configured to control said cursor displayed on said display for inputting the search criteria.

3. The system, as recited in claim 1, wherein the remote database further includes like associations to content information based upon like criteria and wherein a like association is created when a search item and content information in the remote database are like or similar based upon said like criteria.

4. The system, as recited in claim 3, wherein the like associations are preprocessed prior to said user interface receiving inputs of search criteria.

5. The system, as recited in claim 1, wherein the content information further includes user interaction information relating to a user's interaction with each media source type.

6. The system, as recited in claim 1, wherein the search further includes filtering the search results by comparing the search results from the remote database to local content information availability of the computer system.

7. The system, as recited in claim 1, wherein said plurality of hardware is operably coupled to said processor, and wherein each one of said plurality of hardware corresponds to each unique media source type.

8. The system, as recited in claim 7, wherein said plurality of hardware are selected from a group consisting of a satellite dish, antenna, cable, video cassette recorder (VCR), television, electronic program guides (EPG), Public Switched Telephone Network (PSTN), integrated services digital network (ISDN), Internet, home network, CD/DVD jukebox, broadcast, personal computer (PC), and game player.

9. A method of searching across one or more media source types by a computer system comprising:
    inputting search criteria for a search relating to an item of a first media source type, the item being one of a first plurality of items of the first media source type;
    limiting the search to said one or more media source types;
    conducting the search based on the search criteria in a database, the database being a remote database, wherein the search is conducted in one or more sections of the database, each of the one or more sections of the database respectively corresponding to one of said one or more media source types,
    wherein the one or more sections comprises a first section of the database which includes content information about the first plurality of items, the content information coming from a plurality of content sources, said plurality of content sources being a plurality of hardware coupled to said computer system, wherein the one or more sections further comprises a second section of the database which includes content information about a second plurality of items which are of a second media source type, and wherein the search further includes filtering search results by comparing the search results from the remote database to local content source availability of the computer system, wherein the remote database is a voluminous database and contains preprocessed links of like information in two sections, the first section containing preprocessed links to like information within same media source type and the second section containing preprocessed links to like information across all media types prior to said user interface receiving inputs of the search criteria;
    providing the search results of the search on a display; and
    storing the first section of the database in a memory.

10. The method, as recited in claim 9, the method further comprising:
conducting the search in the remote database and in a local database.

11. The method, as recited in claim 9, wherein each one of said plurality of hardware corresponds to each unique media source type.

12. The method, as recited in claim 11, wherein said plurality of hardware are selected from a group consisting of a satellite dish, antenna, cable, video cassette recorder (VCR), television, electronic program guides (EPG), Public Switched Telephone Network (PSTN), integrated services digital network (ISDN), Internet, home network, CD/DVD jukebox, broadcast, personal computer (PC), and game player.

13. The method, as recited in claim 9, wherein the remote database further includes like associations to content information based upon like criteria, and wherein a like association is created when a search item and content information in the remote database are like or similar based upon said like criteria.

14. The method, as recited in claim 13, wherein the like associations are preprocessed prior to said inputting.

15. The method, as recited in claim 9, wherein content information includes user interaction information relating to a user's interaction with each media source type.

16. The method, as recited in claim 9, further comprising filtering the search results by comparing the search results from the remote database to local content information availability of the computer system.

17. A computer system configured to search across one or more media source types comprising:
a user interface configured to receive inputs of search criteria for a search relating to an item of a first media source type, the item being one of a first plurality of items of the first media source type;
at least one processor configured to execute instructions to cause a computer to:
limit the search to said one or more media source types,
conduct the search based on the search criteria in a database, the database comprising a remote database and a local database,
wherein the search is conducted in one or more sections of the database, each of the one or more sections of the database respectively corresponding to one of said one or more media source types, and the one or more sections comprising a first section of the database which includes content information about the first plurality of items, the content information coming from a plurality of content sources, said plurality of content sources being a plurality of hardware coupled to said computer system and
wherein said one or more sections of the database comprises a second section of the database which includes content information about a second plurality of items which are of a second media source type, wherein the search further includes filtering search results by comparing the search results from the remote database to the local content source availability of the local database, wherein the remote database is a voluminous database and contains preprocessed links of like information in two sections, the first section containing preprocessed links to like information within same media source type and the second section containing preprocessed links to like information across all media types prior to said user interface receiving inputs of the search criteria;
a display configured to provide the search results of the search; and
memory coupled to said processor and configured to store the first section of the database.

18. The computer system, as recited in claim 17,
wherein the display is the display of a computer; and
wherein the local database is stored in a memory of said computer system.

19. The system, as recited in claim 17,
wherein the display is the display of a computer; and
wherein the local database is stored in a memory accessible to said computer system via a local area network.

20. The computer system, as recited in claim 17,
wherein the remote database is a mirror of the local database giving regard to the available media source types.

21. A method of searching across one or more media source types comprising:
inputting search criteria for a search relating to an item of a first media source type, the item being one of a first plurality of items of the first media source type;
limiting the search to said one or more media source types;
conducting the search based on the search criteria in a database, the database comprising a remote database and a local database, wherein the search is conducted in one or more sections of the database, each of the one or more sections of the database respectively corresponding to one of said one or more media source types, wherein the one or more sections comprises a first section of the database which includes content information about the first plurality of items, the content information coming from a plurality of content sources, wherein the one or more sections further comprises a second section of the database which includes content information about a second plurality of items which are of a second media source type, wherein the search further includes filtering search results by comparing the search results from the remote database to local content source availability of the local database, wherein the remote database is a voluminous database and contains preprocessed links of like information in two sections, the first section containing preprocessed links to like information within same media source type and the second section containing preprocessed links to like information across all media types prior to said user interface receiving inputs of the search criteria;
providing the search results of the search on a display; and
storing the first section of the database in a memory.

* * * * *